(12) United States Patent
Wäny

(10) Patent No.: US 6,815,685 B2
(45) Date of Patent: Nov. 9, 2004

(54) PHOTODETECTOR AND METHOD FOR DETECTING RADIATION

(75) Inventor: Martin Wäny, Schindellegi (CH)

(73) Assignee: Photonfocus AG, Lachen (CH)

(*) Notice: Subject to any disclaimer, the term of this patent is extended or adjusted under 35 U.S.C. 154(b) by 69 days.

(21) Appl. No.: 10/148,683
(22) PCT Filed: Dec. 21, 2000
(86) PCT No.: PCT/EP00/13114
§ 371 (c)(1), (2), (4) Date: Oct. 1, 2002
(87) PCT Pub. No.: WO01/46655
PCT Pub. Date: Jun. 28, 2001

(65) Prior Publication Data
US 2003/0136915 A1 Jul. 24, 2003

(30) Foreign Application Priority Data
Dec. 22, 1999 (GB) ............................. 9930257

(51) Int. Cl.$^7$ ........................................... H01L 27/148
(52) U.S. Cl. ............................. 250/370.14; 250/208.1
(58) Field of Search ..................... 250/370.14, 208.1, 250/208.2, 214.1; 257/147, 213, 226, 229, 230, 234, 292, 264, 290; 348/292, 294, 302, 300, 301, 303; 364/490; 377/58, 60

(56) References Cited

U.S. PATENT DOCUMENTS

| | | | |
|---|---|---|---|
| 4,473,836 A | | 9/1984 | Chamberlain |
| 5,602,407 A | * | 2/1997 | Washkurak et al. ......... 257/223 |
| 5,936,866 A | | 8/1999 | Seitz et al. |
| 6,020,581 A | * | 2/2000 | Dennard et al. ......... 250/208.1 |
| 6,320,616 B1 | * | 11/2001 | Sauer ........................ 348/241 |
| 6,452,153 B1 | * | 9/2002 | Lauxtermann et al. ... 250/208.1 |

FOREIGN PATENT DOCUMENTS

| | | |
|---|---|---|
| FR | 2751823 A1 | 1/1998 |
| JP | 10250516 | 9/1998 |
| WO | WO0030343 | 5/2000 |
| WO | WO0146655 | 6/2001 |

OTHER PUBLICATIONS

Vietze, "Active pixel image sensors with application specific performance based on standard silicon CMOS processes", p. 97ff Dissertation submitted to the Swiss federal institute of technology, Zurich, Switzerlan. Diss. ETH No. 12038.

* cited by examiner

Primary Examiner—Constantine Hannaher
Assistant Examiner—Otilia Gabor
(74) Attorney, Agent, or Firm—Tarolli, Sundheim, Covell & Tummino L.L.P.

(57) ABSTRACT

A photodetector and a method for detecting radiation are disclosed. The photodetector comprises a zone of a semiconductor material suitably doped to collect photogenerated charges, coupled in parallel to a capacitance between a ground voltage and a sensing node. A metal oxide semiconductor (MOS) transistor is coupled at its source and a drain between the sensing node and a supply voltage, and a means for applying a predetermined voltage to the gate of the transistor Ls provided. In operation, the capacitance is first charged so that the magnitude of a voltage at the sensing node is greater than a transition voltage magnitude, and a predetermined gate voltage is applied. The transistor then is non-conductive, and a photocurrent of a magnitude dependent on the intensity of incident radiation flows through the zone of semiconductor material, discharging the capacitance and causing the sensing node voltage to vary substantially linearly with the photocurrent magnitude. At some point, the sensing node voltage reaches the transition voltage, and thereafter the transistor becomes conductive and the photocurrent generates a sensing node voltage which changes substantially logarithmically with the photocurrent magnitude. By combining aspects of integrated and logarithmic photodetectors, a fast response time and a high dynamic range are achieved.

19 Claims, 2 Drawing Sheets

PHOTODETECTOR AND METHOD FOR DETECTING RADIATION

The invention relates to a photodetector, or optoelectronic sensor, and a method for detecting radiation.

STATE OF THE ART

To date, two principles for detecting radiation in solid-state image sensors prevail: charge-coupled-device (CDD) sensors and metal oxide semiconductor (MOS) sensors. CCD sensors are limited in dynamic range, because of the limited capacitance under the charge collecting gate of the CCD. Many applications, however, require a wide dynamic range signals of up to 140 dB in terms of the relationship between minimum and maximum detectable. In MOS sensors, particularly in active pixel sensors (APS) which use CMOS technology, this problem can be solved by using a detector producing a logarithmic response to the incident light intensity see reference [Cha 1]. But such a logarithmic response detector disadvantageously has a response time inversely proportional to the light intensity. This is a problem because many applications require a high readout speed over the whole dynamic range, including for very low radiation intensities, where classical logarithmic response detectors have an extremely long response time see reference [Vie 2].

In a classical logarithmic response photodetector, as shown schematically in FIG. 1, photodiode 100 is connected to the channel of a MOS transistor 102. The gate 104 of the transistor is connected to its drain. Light impinging on the photodiode generates a photocurrent $I_{ph}$ that is converted into a voltage over the MOS transistor. For typical photocurrents from femtoamperes to nanoamperes, the transistor operates in weak inversion and the voltage across the transistor $V_{GS}$ (gate to source voltage) can be calculated using formula 1.

$$V_{GS} = \frac{kT}{\kappa q}\ln\left(\frac{I_{ph}}{I_0}\right) + V_{TH} \qquad \text{Formula 1}$$

In formula 1, κ is a process dependent transistor parameter, $I_0$ is the drain current at the onset of the weak inversion operation of the transistor and $V_{TH}$ is the transistor's threshold voltage. kT/q is roughly 26 mV at ambient temperature (k=Boltzmann's constant, T=temperature and q=electronic charge).

To understand the response time of a logarithmic detector the equivalent circuit, or incremental model, of FIG. 2 can be considered. In this equivalent circuit, the loading MOS transistor is replaced by a transconductance 106, whose value $g_{mlog}$ depends on the photocurrent $I_{ph}$, and the photodiode is replaced by an equivalent current source 107 which drains current from the transconductance 106. See formula 2.

$$g_{mlog} = \frac{\delta I_{ph}}{\delta V_{DS}} \propto I_0\exp(V_{DS}) \qquad \text{Formula 2}$$

In formula 2, $V_{DS}$ is the drain to source voltage across the transistor.

Thus at a given light intensity, the response time of the detector to a small change of the photocurrent is given by formula 3, where $C_{ph}$ is the capacitance of the photodiode capacitor 108. This response time becomes excessively long for very small photocurrent values.

$$\tau = \frac{C_{ph}}{g_{mlog}} \qquad \text{Formula 3}$$

Integrating CMOS photodetectors overcome the problem of the response time by performing a reset of the accumulated photocharge after readout. But since the response of these sensors is linear to the incident light intensity, such integrating sensors have a dynamic range limited by the voltage swing on the integration capacitance on the one hand, and the minimum detectable signal due to readout noise on the other hand.

SUMMARY OF THE INVENTION

The invention provides a photodetector, or optoelectronic sensor, and a method for detecting light as defined in the appended independent claims. Preferred or advantageous features of the invention are defined in dependent subclaims.

In order to realise a photodetector providing both fast response time and high dynamic range, the invention may advantageously provide a combination of aspects of the integrating and logarithmic photodetectors.

In a preferred embodiment of the photodetector, a photodiode (or other zone of semiconductor material for collecting photogenerated charges) and a capacitance are coupled in parallel between a ground line and a sense node, and the channel of a MOS transistor is coupled between the sense node and a supply voltage line. Usually, the capacitance may be the parasitic capacitance of the photodiode (or the zone of photosensitive semiconductor material) and neighbouring components. A low capacitance is usually desirable as this improves circuit sensitivity.

In an initial reset, the capacitance is charged so that the sense node voltage is above a transition voltage as described below.

After resetting, the transistor gate voltage is set so as to block, or switch off, the transistor, and the photodetector enters a sampling phase. Current flows through the photodiode in relation to the radiation intensity incident on it, which initially discharges the capacitance so that the sense node voltage falls substantially linearly in relation to the radiation intensity. At this stage no current flows through the transistor but if and when the sense node voltage falls to the transition voltage, the transistor enters its weak inversion operation domain. The photocurrent can then flow through the MOS transistor channel and so the sense node voltage begins to fall logarithmically in relation to the radiation intensity.

The transition voltage is equal to the gate voltage applied to the load transistor during sampling minus the transistor threshold voltage. Advantageously, the transition voltage can therefore be set by controlling the gate voltage or by adapting the threshold voltage by technological parameter adjustment.

In more general terms, it will be appreciated that the invention allows the load transistor to be used in both its normal mode, during which the photodetector response is linear, and in its weak inversion mode, during which the photodetector response is logarithmic. In addition, the invention ensures a smooth transition between these modes and makes it possible to choose the level at which the transition occurs.

In a further preferred implementation, the transition voltage may be varied during operation, such as during a sampling phase or between sampling phases, by varying the gate voltage of the load transistor. This may advantageously allow even more flexible control of the linear/logarithmic response of the photodetector and may allow the detector's dynamic range to be further increased.

An important feature of preferred embodiments of the invention is therefore to be able to choose, or control, the sense node voltage at the beginning of the sampling phase and to choose, or control, the gate voltage of the load transistor during the sampling phase. These voltages determine the behaviour of the circuit and the transition from linear to logarithmic behaviour.

Thus, the invention may advantageously provide a photodetector and a method of detecting radiation which provide a much greater dynamic range and speed of response than conventional detectors. In particular, the invention may achieve a logarithmic response over part of its dynamic range without the drawback of increasing response time for low light intensities.

In a preferred embodiment, the sense node voltage after the initial reset may conveniently be close to the circuit supply voltage, achieved by coupling the sense node to the supply voltage line, for example by controlling the load transistor gate voltage to-switch on the load transistor channel.

In this document, the invention is embodied using a photodiode as a radiation sensitive element. In practice, however, a variety of types of component comprising zones of semiconductor material suitably doped to generate charges in response to incident radiation could be used.

In this document, examples are given in which the supply voltage is greater than the ground voltage. This could be reversed and the described circuits modified accordingly to create dual versions of the circuits, as the skilled person would be aware.

In practice, a photodetector of the invention may have a dynamic range of 120 dB or more, such as 160 dB. In tests, such circuits have achieved a measured dynamic range of about 200 dB.

The photodetector and method of the invention may advantageously find many applications, in particular for viewing applications with high contrast in the viewed scene. Such applications may include surveillance applications, soldering control, welding control or automotive driving assistance applications. Other applications would readily be apparent to the skilled person.

DESCRIPTION OF SPECIFIC EMBODIMENTS

Specific embodiments and the best mode of the invention will now be described by way of example, with reference to the drawings, in which.

Figure 1:
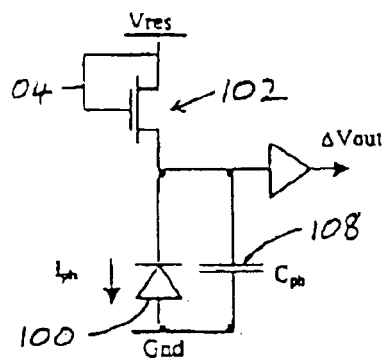
FIG. 1 (prior art) shows a conventional logarithmic photodetector circuit.
Figure 2:
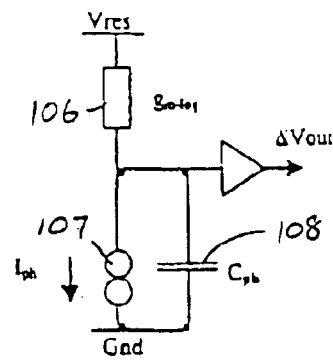
FIG. 2 (prior art) shows an equivalent circuit, or incremental model, of the circuit of FIG. 1.
Figure 3:
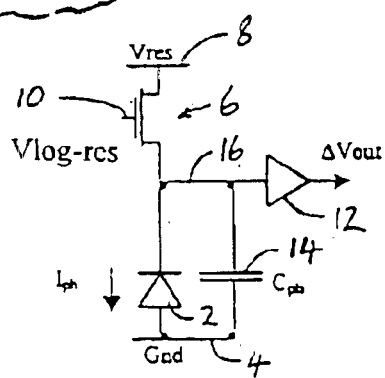
FIG. 3 shows a photodetector circuit according to a first embodiment of the invention.

A schematic of a photodetector according to a first embodiment of the invention is drawn in FIG. 3.

A photodiode 2 is connected between a ground voltage line 4 and the channel of a MOS Transistor 6 (Source terminal). The source terminal is also connected to a readout circuit 12 with high input impedance, in order to sense the voltage on the sensing node 16 between the photodiode and the transistor and to generate a corresponding output voltage $\Delta V_{out}$. The drain terminal of the transistor 6 is coupled to a voltage $V_{res}$. A capacitance 14 of value $C_{ph}$ is connected in parallel with the photodiode. This capacitance may not, in practice, be a separate component but may be formed of all the parasitic capacitances of the sense node 16.

Figure 4:
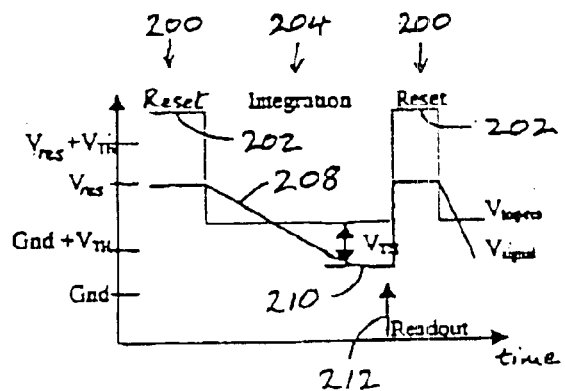
FIG. 4 is a timing diagram for the circuit of FIG. 3.

The circuit operates as follows. A readout cycle, as illustrated in the timing diagram of FIG. 4, begins with the resetting 200 of the voltage across the photodiode and the capacitance (i.e. the sense node voltage, termed $V_{signal}$ in FIG. 4) to a reset voltage $V_{res}$. This can be done by applying a voltage 202 higher than the reset voltage plus the threshold voltage $V_{TH}$ of the MOS ($V_{res}+V_{TH}$ in FIG. 4) to the gate terminal. The MOS is then conducting, and regardless of the photocurrent, the photodiode and capacitor will be set to the reset voltage.

The gate terminal is then switched to a predetermined voltage $V_{log-res}$ within an analogue voltage range. The predetermined voltage is higher than the ground voltage of the photodiode plus the threshold voltage of the transistor (Gnd+$V_{TH}$) and equal to or lower than the reset voltage ($V_{res}$). The MOS transistor is now blocked, or switched off. The circuit now enters a sampling interval 204 during which integration of the radiation incident on the photodiode occurs. The photocurrent then discharges the capacitor 14 connected to the sense node 16. This is the integrating mode of operation of the detector, and the sense node voltage decreases at a rate 208 which is initially linearly proportional to the impinging light intensity. If the impinging light intensity is high enough to discharge the sense node capacitance below the gate voltage minus the threshold voltage ($V_{log-res}-V_{TH}$), the detector enters a logarithmic mode 210. In this mode, the MOS enters its weak inversion operation domain, and the photocurrent can flow through the MOS channel. The gate-source voltage ($V_{GS}$) generated by the photocurrent is then described by formula 1 above. The signal on the sense node is thus compressed in the logarithmic mode by the logarithmic law of formula 2.

After a predetermined sampling time, the voltage at the sense node is read 212 by the readout circuit to produce a corresponding output signal $\Delta V_{out}$, and the photodiode is reset again 200 by applying a high voltage to the gate terminal of the MOS transistor.

Figure 5:
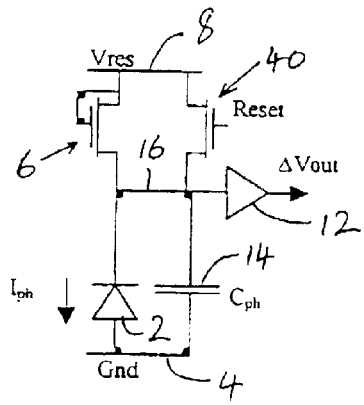
FIG. 5 shows a photodetector circuit according to a second embodiment of the invention.

In an alternative embodiment, as illustrated in FIG. 5, instead of switching the load transistor 6 to reset the circuit, the gate of this transistor can be set to a predetermined analogue voltage value, between $V_{res}$ and $V_{TH}$, and a second MOS transistor 40 can be used as a reset switch. As shown in FIG. 5, the gate of the photodetector transistor 6 in this embodiment can conveniently be coupled to $V_{res}$ at the drain of the transistor. However, selection of the predetermined gate voltage valve within the range described determines the point at which the circuit response changes from linear to logarithmic, and so may advantageously be selected or varied to tailor the circuit for different applications.

The circuit of FIG. 5 has the advantage that no voltage greater than the supply voltage $V_{res}$ is needed. This is of particular benefit in an integrated circuit implementation where, using this embodiment, no voltage greater than the supply voltage would be needed on the chip. By contrast, in the embodiment described in FIGS. 3 and 4 a voltage $V_{res}+V_{TH}$ greater than $V_{res}$, the supply voltage, was required to raise the sense node to $V_{res}$ during the reset phase.

Figure 6:
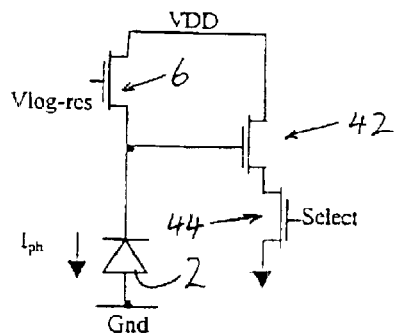
FIG. 6 shows a photodetector circuit according to a third embodiment of the invention, suited for integration into one or two dimensional devices.

The photodetector of the invention can be realised with very few components, and is therefore suited for integration in 1 or 2 dimensional arrays (line sensors or image sensors). Preferably a two dimensional array of photodetectors may be realised by integrating the output amplifier or buffer (readout circuit) directly with the detector for each pixel as for active pixel sensors (APS). This can be done most easily by adding a source follower transistor 42 and a select transistor 44 to the detector, as drawn in FIG. 6 in conventional manner. This allows information to be extracted from a pixel of a 1 or 2 dimensional array of photodetectors. In FIG. 6 the supply voltage is conventionally termed VDD (voltage drain-to-drain).

In the described embodiments, MOS transistors have been shown. In practice pMOS or nMOS transistors or equivalent components may be used as appropriate.

In the embodiments of FIGS. 3 and 5 described above, a fixed transistor gate voltage has been applied during the sampling, or integration, phrase of operation. Advantageously, the gate voltage can be selected to vary the point of the change from linear to logarithmic response of the detector. Further advantageously, however, the gate voltage may be varied during or between sampling phases, for example by varying the gate voltage linearly from its maximum ($V_{res}+V_{TH}$ in FIGS. 3 and 4) to minimum (Gnd+$V_{TH}$ in FIGS. 3 and 4) values, or by varying it under active control or using a feedback control system, to further modify the linear/logarithmic compression curve and, preferably, to further increase the detector's dynamic range.

Figure 7:
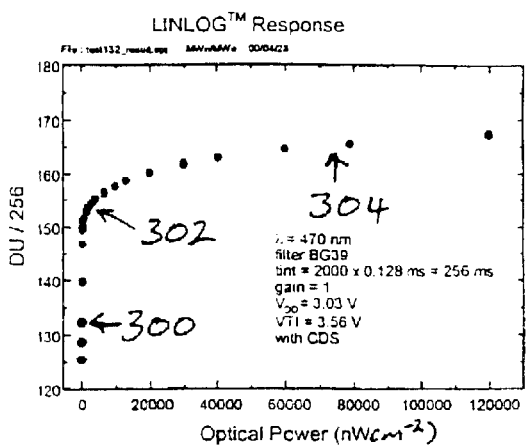
FIG. 7 is a plot of the output of a photodetector embodying the invention against incident optical power, illustrating linear and logarithmic response regions.
Figure 8:
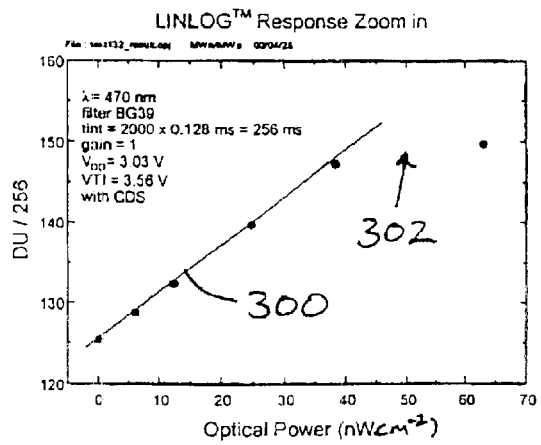
FIG. 8 is an enlargement of a portion of FIG. 7, showing the transition between the linear and logarithmic response regions.

FIG. 7 illustrates the measured performance of a circuit embodying the invention in terms of the sense node voltage measured at the end of the sampling time plotted against incident radiation power. The circuit is termed LINLOG™. The plot clearly shows the linear response 300 at low radiation powers and the smooth transition 302 to a logarithmic response 304 at high radiation powers. FIG. 8 enlarges the low radiation power portion of the plot of FIG. 7, more clearly showing the linear region 300 and the transition region 302.

What is claimed is:

1. A photodetector comprising:
   a zone of a semiconductor material suitably doped to collect photogenerated charges, coupled between a ground voltage and a sensing node;
   a capacitance coupled in parallel to the zone of semiconductor material, between the ground voltage and the sensing node;
   a metal oxide semiconductor (MOS) transistor coupled at its source and drain between the sensing node and a supply voltage; and
   a means for applying a predetermined voltage to the gate of the transistor;
   in which, if the capacitance has been charged so that the magnitude of a voltage at the sensing node is greater than a transition voltage magnitude and a predetermined gate voltage is applied so that the transistor is non-conductive, then a photocurrent of a magnitude dependent on the intensity of radiation incident upon the zone of semiconductor material flows therethrough, discharging the capacitance and causing the sensing node voltage to vary substantially linearly with the photocurrent magnitude until the sensing node voltage reaches the transition voltage, and thereafter the transistor becomes conductive and the photocurrent generates a sensing node voltage which changes substantially logarithmically with the photocurrent magnitude.

2. A photodetector according to claim 1, in which the zone of semiconductor material is a photodiode.

3. A photodetector according to claim 1 in which the capacitance comprises a parasitic capacitance of the zone of semiconductor material.

4. A photodetector according to claim 1, comprising a sampling control means for resetting the photodetector by recharging the capacitance at the start of a sampling time during a reset phase and controlling a readout circuit coupled to the sensing node to generate an output dependent on the sensing node voltage at the end of the sampling time.

5. A photodetector according to claim 4, in which the photodetector's response to radiation can be varied by controlling the sensing node voltage at the end of the reset phase and the transistor gate voltage during the sampling time.

6. A photodetector according to claim 1, in which the photodetector is reset by controlling the means for applying a predetermined voltage to the transistor gate to apply a gate voltage which makes the transistor conductive and allows current to flow through the transistor to charge the capacitance.

7. A photodetector according to claim 1, comprising a reset transistor coupled between the reset voltage and the sensing node, and in which the photodetector is reset by applying a gate voltage to the reset transistor which makes it conductive and allows current to flow through the reset transistor to charge the capacitance.

8. A photodetector according to claim 1, comprising a readout circuit for generating an output signal dependent on the sensing node voltage.

9. A photodetector according to claim 8, in which the readout circuit is a source follower circuit.

10. A photodetector according to claim 1, implemented in an active pixel sensor.

11. A photodetector according to claim 1, in which the gate voltage means can apply a gate voltage which varies over time.

12. A photodetector according to claim 1, in which the transistor operates in its normal mode, and is blocked, before the sensing node voltage reaches the transition voltage, and operates in a weak inversion mode thereafter.

13. A photodetector array comprising a plurality of photodetectors as defined in claim 1.

14. A method for detecting radiation in a photodetector in which a zone of a semiconductor material suitably doped to collect photogenerated charges is coupled at a sensing node to the channel of a metal oxide semiconductor (MOS) transistor, comprising the steps of:
   resetting the photodetector by charging a capacitance coupled in parallel to the zone of semiconductor material so that the magnitude of the sensing node voltage is greater than a transition voltage magnitude;
   applying a predetermined gate voltage to the transistor to block, or switch off, the transistor channel;
   sampling incident radiation intensity by illuminating the zone of semiconductor material to generate a photocurrent, which discharges the capacitance such that the sending node voltage changes substantially linearly in relation to the photocurrent, while the transistor operates in its normal mode, until the sensing node voltage reaches the transition voltage; and after the sensing node voltage reaches the transition voltage, continuing to illuminate the zone of semiconductor material and generate the photocurrent while the transistor operates in a weak inversion mode so that the sensing node voltage changes substantially logarithmically in relation, to the photocurrent.

15. A method according to claim 14, in which the capacitance comprises a parasitic capacitance of the zone of semiconductor material.

16. A method according to claim 15, comprising the step of generating an output signal based on the sensing node voltage at the end of a predetermined sampling time.

17. A method according to claim 16, comprising the step of varying the transistor gate voltage with time in order to control the response of the photodetector.

18. A method according to claim 17, in which the transistor gate voltage is varied during radiation sampling.

19. A method according to claim 18, comprising the step of controlling the sampling node voltage at the end of resetting in order to control the response of the photodetector.

* * * * *